United States Patent
Dowzall et al.

(10) Patent No.: US 6,524,413 B1
(45) Date of Patent: Feb. 25, 2003

(54) PRESERVATION MAT BOARD

(75) Inventors: Martin Dowzall, Franklin Lakes, NJ (US); David Wellings Pointon, Rivervale, NJ (US)

(73) Assignee: Nielsen & Bainbridge LLC, Paramus, NJ (US)

(*) Notice: Subject to any disclaimer, the term of this patent is extended or adjusted under 35 U.S.C. 154(b) by 0 days.

(21) Appl. No.: 09/635,017

(22) Filed: Aug. 9, 2000

Related U.S. Application Data

(60) Provisional application No. 60/147,870, filed on Aug. 9, 1999.

(51) Int. Cl.[7] .............................................. B32B 31/14
(52) U.S. Cl. .................. 156/78; 40/768; 156/244.22; 252/184; 422/40; 521/91; 524/450
(58) Field of Search .................. 40/468; 252/184; 524/450; 422/40; 156/244.22, 78; 428/313.9; 521/91

(56) References Cited

U.S. PATENT DOCUMENTS

| | | | |
|---|---|---|---|
| 3,062,698 A | * | 11/1962 | Aykanian ................ 156/308.2 |
| 3,382,595 A | * | 5/1968 | Shore ........................ 40/768 |
| 3,502,532 A | * | 3/1970 | Frielingsdorf ........... 156/244.22 |
| 4,108,806 A | * | 8/1978 | Cohrs et al. ................ 523/205 |
| 4,489,120 A | | 12/1984 | Hollinger, Jr. |
| 5,041,272 A | | 8/1991 | Tamura |
| 5,330,844 A | * | 7/1994 | Taguchi et al. ............. 524/450 |
| 5,374,335 A | | 12/1994 | Lindgren et al. |
| 5,525,296 A | | 6/1996 | Hollinger, Jr. |
| 5,603,997 A | | 2/1997 | Lindgren et al. |
| 5,633,054 A | | 5/1997 | Hollinger, Jr. |
| 5,676,909 A | * | 10/1997 | Hollinger ................. 162/181.2 |
| 5,683,662 A | | 11/1997 | Holinger, Jr. |
| 5,693,384 A | | 12/1997 | Hollinger, Jr. |
| 5,714,120 A | | 2/1998 | Hollinger, Jr. |
| 5,922,280 A | | 7/1999 | Hollinger, Jr. |

* cited by examiner

Primary Examiner—John J. Gallagher
(74) Attorney, Agent, or Firm—Darby & Darby

(57) ABSTRACT

A method for manufacturing a preservation mat board for use in framing a picture frame. The mat board includes a top facing layer and/or backing layer, each comprising a buffer and/or deacidifying agent, adhered to a middle board or layer by an adhesive containing zeolites. Another embodiment discloses mixing polystyrene pellets with zeolite using an extruder and one or more blowing agents to form a foam material. One or more paper layers comprising a buffer and/or deacidifying agent are heat-fused, without the use of adhesives, to the surface of the foam to form a preservation mat board.

26 Claims, 1 Drawing Sheet

PRESERVATION MAT BOARD

This application claims the benefit of Provisional Application No. 60/147,870, filed Aug. 9, 1999.

FIELD OF THE INVENTION

The present invention relates to mat boards of the type used to frame an article, such as a photograph or work of art. More particularly, the present invention relates to a method for manufacturing a mat board constructed in such a way as to enhance preservation of the article with which it is used from damage caused by pollutants and chemicals.

DESCRIPTION OF RELATED ART

The need to preserve archival articles has been recognized for many years. A number of patents issued to William K. Hollinger, Jr. disclose methods for preserving archival articles. A significant feature of the Hollinger patents is the use of molecular sieves and, in particular, zeolites, to remove pollutants from the environment of an archival item.

In particular, U.S. Pat. No. 5,525,296 discloses preservation articles which may be positioned in proximity to an archival article to preserve the archival article. A molecular sieve, such as zeolites, and alkaline buffers are incorporated into the paper that functions as a preservation article. Examples of the preservation article as a picture framing mounting board and a mat board, which can be used for displaying an archival article, such as a painting, are shown in FIGS. 1 and 2, respectively. In both embodiments, the zeolites and alkaline buffers are incorporated into the slurry during manufacture of various paper layers forming the mounting or mat board.

U.S. Pat. No. 5,676,909 discloses various method for applying preservation coatings and adhesive compositions containing an adsorbent, such as zeolite and, in most cases, an alkaline buffer to a substrate. The patent refers directly to the use of an alkaline mat board with a rabbet to which is applied a composition coating containing an adsorbent (i.e. zeolite) only. In example 3, an archival article was placed beneath a preservation article made by laminating together two sheets of alkaline buffered tan paper using an adhesive composition comprising an adsorbent, e.g. zeolite.

Currently, mat board for use in framing works of art is sold by the assignee of this application under the trademark ARTCARE®. This product is manufactured in accordance with the teachings of the '296 patent in that the zeolites and alkaline buffers are incorporated during the manufacture of the paper itself. Several disadvantages are associated with incorporating zeolites into the slurry during the paper manufacturing process. In the first place, it is difficult to obtain a uniform distribution of the zeolites in the slurry. Any deficiency of zeolite in a particular area may cause damage to the archival article. In addition, zeolites are relatively expensive and a significant amount of the zeolites are undesirably lost with the evacuation of the water solution during the manufacturing process. The zeolites are relatively expensive and, therefore, it is obviously desirable to avoid this unintentional waste. Another disadvantage is that since the zeolite is dispersed among the fibers the paper must be relatively dense to ensure proper coverage or protection against pollutants that may otherwise penetrate through the spaces between the paper fibers. These conventional preservation methods do not adsorb/absorb all of the pollutants.

It is therefore desirable to develop a method for manufacturing a preservation mat board that further reduces the exposure of archival articles to harmful pollutants and chemicals, while overcoming the problems described above.

SUMMARY OF THE INVENTION

A first embodiment of the present invention is directed to a method for manufacturing a preservation mat board using an adhesive composite containing zeolite for adhering one or more paper layers together.

In a second embodiment of the present invention, a preservation mat board includes a foam manufactured with zeolite dispersed therein and a facing paper heat-sealed (without adhesive) to one or more sides of the foam.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

One embodiment of the present invention is directed to a method for manufacturing a preservation mat board for use in framing an article. A first adhesive composition including a first adsorber is applied to a first surface of a support layer and a first layer is adhered to the adhesive coated first surface of the support layer. In an alternative embodiment a second layer may be adhered to a second surface of the support layer opposite the first surface using a second adhesive composition including a second adsorber.

Another embodiment of the present invention relates to a method for manufacturing a preservation mat board for use in framing an article. A first adsorber and polystyrene pellets are mixed together to form a middle layer. Thereafter, a first layer is heat-sealed to a first surface of the middle layer. In an alternative embodiment, a second layer may be heat-sealed to a second surface of the middle layer.

The first and second adsorbers may be the same or different. The first and second layers may include a buffer or deacidifying agent, wherein the buffer or deacidifying agent in the first or second layers may be the same or different.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

Figure 1:
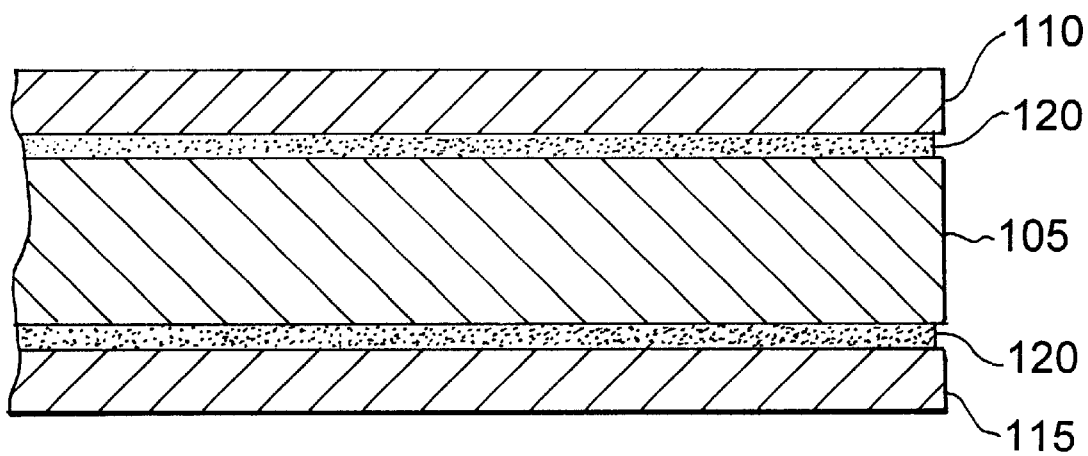
FIG. 1 is a first embodiment of a preservation mat board in accordance with the present invention.

Mat boards for framing an article, such as a photograph or work of art, are manufactured by laminating at least one paper layer to another, generally heavier gauge, paper layer. FIG. 1 is a cross-sectional view of a mat board 100 in accordance with the present invention. A top facing paper 110 and/or a backing paper 115 are adhered to opposite sides of a middle board or layer 105 by a layer of laminating adhesive 120. Middle board or layer 105, top facing paper 110, and backing paper 115 each include a buffer agent and/or deacidifying agent, which includes any compound that reduces or prevents the article from being affected by acidic components. An adsorber, such as zeolite, is incorporated into the adhesive used to form laminating adhesive layers 120. In addition to zeolite, the adhesive composition may also include a buffer and/or deacidifying agent. This adhesive composition is applied as a wet coating to one surface of the paper layer, e.g., the top facing layer and/or the backing layer, which is adhered to the middle board or layer and allowed to dry.

The wet coating preferably penetrates a portion of the paper fibers proximate the surface to create an adhesive bond. As a result, the zeolites contained in the adhesive composition disperse into a portion of the paper fibers proximate the surface of the middle board or layer. Disbursement of the zeolite particles from the adhesive composition into a portion of the middle board or layer proximate its outer surface is possible when the middle board or layer has less dense characteristics. The penetration of zeolite particles into the paper fibers makes the mat board significantly more active in preventing or reducing pollution and chemical contaminants than when a more dense paper is used, whereby the zeolite particles are sealed by resins in the adhesive and prevented from dispersing into the paper fibers. In addition to the zeolites, the less dense characteristic of the paper used to form the archival mat board in accordance with the present invention allows for the penetration of a greater percentage of pollutant gases into the paper to be absorbed/adsorbed by the zeolites than when the zeolite is introduced into the paper itself.

If a top facing layer and a backing layer are laminated to the middle board or layer, as shown in FIG. 1, then the mat board includes two adhesive layers 120. The use of two adhesive layers, each containing zeolite, reduces the extent to which the article is exposed to pollutants and chemicals as compared to conventional mat boards in which the zeolite particles are incorporated into the fibers during manufacture of the paper layers. It is, however, within the intended scope of the invention to use a middle board or layer and either a top facing layer or a backing layer, but not both.

Figure 2:
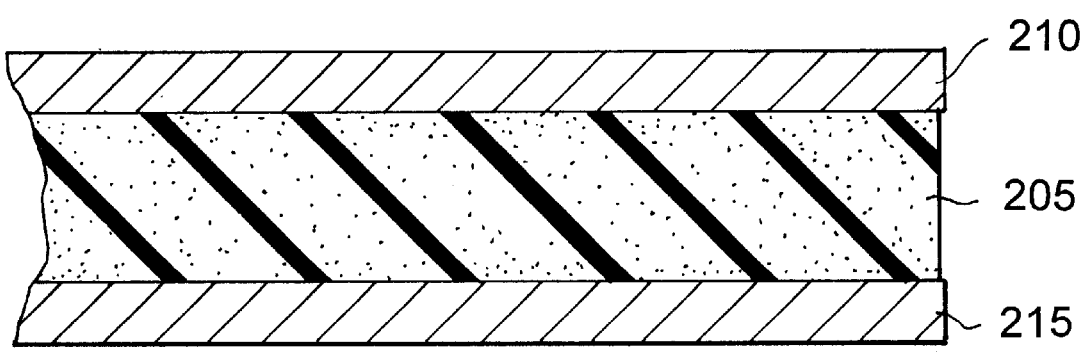
FIG. 2 is a second embodiment of a preservation mat board in accordance with the present invention.

In a second embodiment of the present invention, as shown in FIG. 2, an adsorber, preferably zeolite, is mixed or incorporated with pellets, e.g., polystyrene, using an extruder with one or more blowing agents to form a middle foam board 205. A top facing paper 210 and/or a backing paper 215, preferably containing a buffer and/or deacidifying agent, are heat laminated (without adhesive) to one or both surfaces of the middle foam board 205 to form the mat board 200. The buffer and deacidifying agent are preferably not incorporated into the foam, otherwise it may produce undesirable results in the formation of the foam material. Zeolites may also be distributed in the top facing paper 210 and/or backing paper 215, as well as in the foam.

The following examples are illustrative of the invention, but not intended to limit the scope of the invention.

EXAMPLES

Example 1

An adhesive containing about 80% polyvinyl acetate (PVAc) based adhesive emulsion, with about 20% polyvinyl alcohol (PVOH) standard laminating adhesive 100 parts by weight, a commercial hydrophobic zeolite between about 2 and 25 parts by weight, and, optionally, calcium carbonate about 2 parts by weight, were added as a dispersion in water with a surfactant in laminating together paper, layers to form a mat board. The dispersion contained about 70 parts calcium carbonate, about 0.5 parts Surfynol TG (manufactured by Air Products), and about 29.5 parts water. To form the archival mat board, an 80 gsm paper layer is coated with the adhesive composition at about 50 to 125 um wet thickness and wet laminated to a 1 mm thick middle board or layer comprising alpha cellulose that is acid and lignin free. This process is repeated on an opposite surface of the middle board with another 80 gsm paper layer. The laminate is allowed to dry at ambient conditions for at least 72 hours. Test results show that optimum lamination occurs when the adhesive composition containing concentrations of about 2% to 7% of the zeolite and a maximum about 2% of the calcium carbonate, is applied to the paper layer as a wet coating having a thickness of about 75 um.

A series of tests were conducted to determined the efficacy of incorporating the zeolites alone and with calcium carbonate into the adhesive composition to prevent or substantially reduce the percentage of nitrogen dioxide pollutants from entering a framed print. For each test run a rectangular box of dimensions 250 mm×200 mm×20 mm, having a volume of 1 liter was placed into a 40 liter capacity test chamber. A mat board was adhered to one face of the box so that any nitrogen dioxide pollutant entering the box from the chamber had to pass through the mat board. Atmospheric pressure was maintained in the chamber during the experimental run and all tests started with a zero.concentration of nitrogen dioxide pollutant in the chamber. Dry nitrogen dioxide pollutant was introduced into the test chamber at 20 minute intervals. In an otherwise empty test chamber, that is without the mat board, the concentration of nitrogen dioxide after 8 hours would be about 130 ppm. A control test was performed using a mat board having a top facing layer and a backing layer adhered to respective opposite sides of a middle board or layer by a zeolite-free adhesive. In this test, the top facing layer, the backing layer, and the middle board or layer each contained a buffer agent and zeolite. Another test was performed using a mat board of similar construction to that used in the control test, except that instead of a zeolite-free adhesive, an adhesive composition was used containing about 5% zeolite in accordance with the present invention. The last test was conducted using a mat board having a middle board or layer with a paper layer adhered to only, one side using an adhesive composite containing about 2% calcium carbonate and about 6% zeolite.

TABLE I

|  | @ 4 hrs. $NO_2$ concentration in the box | @ 4 hrs. $NO_2$ concentration in the chamber | @ 8 hrs. $NO_2$ concentration in the box | @ 8 hrs. $NO_2$ concentration in the chamber |
|---|---|---|---|---|
| zeolite-free adhesive | 3 ppm | 32 ppm | 6 ppm | 68 ppm |
| 5% zeolite adhesive on both sides of mat board | 0 ppm | 33 ppm | 0 ppm | 54 ppm |

TABLE I-continued

|  | @ 4 hrs. $NO_2$ concentration in the box | @ 4 hrs. $NO_2$ concentration in the chamber | @ 8 hrs. $NO_2$ concentration in the box | @ 8 hrs. $NO_2$ concentration in the chamber |
|---|---|---|---|---|
| 2% calcium carbonate, 6% zeolite adhesive on one side of mat board only | 1 ppm | 29 ppm | 4 ppm | 60 ppm |

These test results clearly establish that the effectiveness of preventing or substantially reducing the levels of pollutant are significantly improved by incorporating the zeolites into the adhesive composition.

Example 2

Zeolites were introduced into a foam material during its manufacture and the amount of pollution was tested over a period of time. The foam contained Huntsman polystyrene general purpose grade having a melt index less than about 3, preferably about 1.5, Phillips GG petroleum isopentane about 3% to 6%, Boehringer & Ingelheim hydrocerol CF40 about ½% to 1%, Union Carbide type 4A zeolites about 0.5% to 10% having a particle size about 2 micron–8 and a pore size of about 4 angstroms, and mineral oil about 16 oz/500 lbs as a binder. The polystyrene foam was manufactured using a Tandem, Single Screw Extruder about 4½"–6" though a circular die which produces a tubular sectioned foam extrusion. Operating temperatures in the machine were set to about 420° F. in the melting section and about 280° F. in the cooling/mixing section, while the die pressure was set at 1200 lbs/sq. inch. The extrusion was slit to form a flat sheet about 3/16" thick and heat fused between two sheets of index paper containing a buffer agent to form a laminated mat board. No adhesive was used and the only presence of zeolite was in the foam, not in the sheets of index paper. The test results where only about 1% zeolite was present in the foam are shown in Table II below.

TABLE II

|  | polystyrene foam without zeolites; concentration of $NO_2$ in box | polystyrene foam without zeolites; concentration of $NO_2$ in chamber | polystyrene foam with zeolites; concentration of $NO_2$ in box | polystyrene foam with zeolites; concentration of $NO_2$ in chamber |
|---|---|---|---|---|
| @ 1 hr. | 5 ppm | 24 ppm | 1 ppm | 20 ppm |
| @ 2 hrs. | 6 ppm | 62 ppm | 2 ppm | 72 ppm |
| @ 3 hrs. | 7 ppm | 60 ppm | 2 ppm | 65 ppm |
| @ 4 hrs. | 8 ppm | 50 ppm | 3 ppm | 58 ppm |
| @ 5 hrs. | 10 ppm | 45 ppm | 4 ppm | 52 ppm |
| @ 6 hrs. | 10 ppm | 40 ppm | 4 ppm | 48 ppm |
| @ 7 hrs. | 12 ppm | 40 ppm | 5 ppm | 45 ppm |
| @ 8 hrs. | 13 ppm | 35 ppm | 5 ppm | 41 ppm |
| @ 10 hrs. | 14 ppm | 35 ppm | 7 ppm | 41 ppm |

As can be seen, improved results of adsorbing/absorbing the pollutant were obtained with the zeolites dispersed in the foam during manufacture.

The present invention has been shown and described with reference to a mat board, however, it is within the intended scope of the invention to manufacture any other type of archival preservation article using the methods taught herein.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A method for manufacturing a preservation mat board for use in framing an article, said method comprising the steps of:
    mixing a first adsorber and polystyrene pellets and expanding the mixture to form a middle foam layer; and
    heat-sealing a first layer to a first surface of said middle foam layer.

2. The method in accordance with claim 1, further wherein said first layer includes at least one of a first buffer agent and a first deacidifying agent.

3. The method in accordance with claim 1, wherein said adsorber is zeolite.

4. The method in accordance with claim 2, further comprising the step of heat-sealing a second layer to a second surface of said middle foam layer opposite the first surface.

5. The method in accordance with claim 4, wherein said second layer includes at least one of a second buffer agent and a second deacidifying agent.

6. The method in accordance with claim 5, wherein the first buffer, the first deacidifying agent, the second buffer and the second deacidifying agent are the same.

7. The method in accordance with claim 5, wherein the first buffer, the first deacidifying agent, the second buffer and the second deacidifying agent are different.

8. The method in accordance with claim 1, wherein said first layer includes a second adsorber.

9. The method in accordance with claim 8, wherein the first and second adsorbers are the same.

10. The method in accordance with claim 8, wherein the first and second adsorbers are different.

11. The method in accordance with claim 2, wherein the middle foam layer includes at least one of a second buffer and a second deacidifying agent.

12. The method in accordance with claim 11, wherein the first buffer, the first deacidifying agent, the second buffer and the second deacidifying agent are the same.

13. The method in accordance with claim 11, wherein the first buffer, the first deacidifying agent, the second buffer and the second deacidifying agent are different.

14. A preservation mat board for use in framing an article, comprising:
    a middle foam layer formed from a mixture of a first adsorber, foaming agent and polystyrene pellets; and
    a first layer heat sealed to a first surface of said middle foam layer.

15. The preservation mat board in accordance with claim 14, wherein said first layer includes at least one of a first buffer agent and a first deacidifying agent.

16. The preservation mat board in accordance with claim 14, wherein said first adsorber is zeolite.

17. The preservation mat board in accordance with claim 15, further comprising a second layer heat sealed to a second surface of said middle foam layer opposite the first surface.

18. The preservation mat board in accordance with claim 17, wherein said second layer includes at least one of a second buffer agent and a second deacidifying agent.

19. The preservation mat board in accordance with claim 18, wherein the first buffer, the first deacidifying agent, the second buffer and the second deacidifying agent are the same.

20. The preservation mat board in accordance with claim 18, wherein the first buffer, the first deacidifying agent, the second buffer and the second deacidifying agent are the different.

21. The preservation mat board in accordance with claim 15, wherein said middle foam layer includes at least one of a second buffer and a second deacidifying agent.

22. The preservation mat board in accordance with claim 21, wherein the first buffer, the first deacidifying agent, the second buffer, and the second deacidifying agent are the same.

23. The preservation mat board in accordance with claim 21, wherein the first buffer, the first deacidifying agent, the second buffer, and the second deacidifying agent are different.

24. The preservation mat board in accordance with claim 14, wherein said first layer includes a second adsorber.

25. The preservation mat board in accordance with claim 24, wherein the first and second adsorber are the same.

26. The preservation mat board in accordance with claim 24, wherein the first and second adsorber are different.

* * * * *